United States Patent

Schroeder et al.

[15] 3,689,492

[45] Sept. 5, 1972

[54] 1-[4'-OXO-4-(P-FLUOROPHENYL)-N-BUTYL-1']-4-ACETYL-4-(M-HYDROXY-PHENYL-PIPERIDINE

[72] Inventors: Hans-Detlef Schroeder, Am Lenneberg 2; Herbert Merz, Rheinstrasse 16 8/1; Adolf Langbein, Albrecht Duerer Strasse 8, all of Ingelheim/Rhine, Germany; Kurt Freter, c/o Pharma Research 250 Hymus Blvd., Pointe Claire, Quebec, Canada; Karl Zeile, Taunasstrasse 11; Peter Danneberg, Am Lenneberg 2, both of Ingelheim/Rhine, Germany; Rolf, Giesemann, Beethovenstrasse 14, Bingen/Rhine, Germany; Helmut Wick, Gehaurveg 10, Ingelheim/Rhine, Germany

[22] Filed: Dec. 3, 1970

[21] Appl. No.: 94,952

Related U.S. Application Data

[63] Continuation-in-part of Ser. No. 866,380, Oct. 14, 1969, abandoned, which is a continuation-in-part of Ser. No. 732,058, May 27, 1968, abandoned, which is a continuation-in-part of Ser. Nos. 574,574, Aug. 24, 1966, abandoned, and Ser. No. 700,360, Jan. 25, 1968, abandoned.

[30] Foreign Application Priority Data

Sept. 10, 1965 Germany.................B 83 682
Jan. 26, 1967 Germany.................B 90 912

[52] U.S. Cl. ............260/293.8, 424/267, 260/293.6, 260/293.73, 260/253

[51] Int. Cl......................................C07d 29/20
[58] Field of Search............260/293.8, 293.6, 293.73

[56] References Cited

UNITED STATES PATENTS

| | | | |
|---|---|---|---|
| 3,069,426 | 12/1962 | Janssen | 260/294.7 |
| 3,080,372 | 3/1963 | Janssen | 260/294.7 |
| 3,462,427 | 8/1969 | Merz et al | 260/294.7 |

FOREIGN PATENTS OR APPLICATIONS

| | | | |
|---|---|---|---|
| 831M | 9/1961 | France | 260/294.7 |
| 2,025M | 9/1963 | France | 260/294.7 |
| 585,898 | 11/1959 | Canada | 260/294.7 |

*Primary Examiner*—Henry Jiles
*Assistant Examiner*—G. Thomas Todd
*Attorney*—Hammond & Littell

[57] ABSTRACT

Compound of the formula

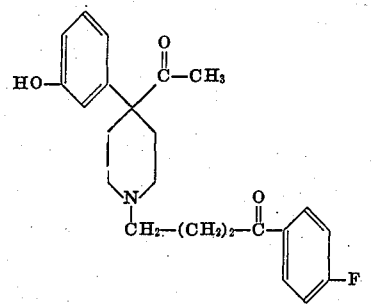

and non-toxic, pharmacologically acceptable acid addition salts thereof, useful as analgesics in warm-blooded animals.

1 Claim, No Drawings

1-[4'-OXO-4-(P-FLUOROPHENYL)-N-BUTYL-1']-4-ACETYL-4-(M-HYDROXY-PHENYL-PIPERIDINE

This is a continuation-in-part of copending application Ser. No. 866,380, filed Oct. 14, 1969 which is a continuation-in-part of copending application Ser. No. 732,058, filed May 27, 1968, which in turn is a continuation-in-part of copending applications Ser. No. 574,574, filed Aug. 24, 1966, and Ser. No. 700,360, filed Jan. 25, 1968, all now abandoned.

This invention relates to novel 1-[4'-oxo-4'-(p-fluoro-phenyl)-n-butyl-1']-4-(m-hydroxy-phenyl)-4-acetyl-piperidine and acid addition salts thereof, as well as to a method of preparing this compound.

The compound according to the present invention is prepared by reacting a secondary 4-(m-substituted-phenyl)-4-acetyl-piperidine of the formula

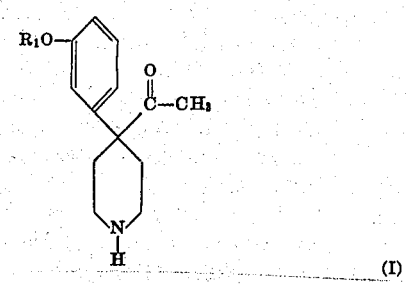

wherein $R_1$ is hydrogen or acyl, with a 4-chlorobutyrophenone of the formula

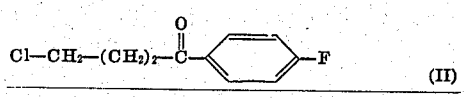

followed by de-acylation if $R_3$ is acyl.

The reaction is preferably carried out in the presence of an inert organic solvent and a weak base, such as sodium bicarbonate, at a temperature between 30° and 150° C. The reactants may be provided in a molar ratio of 1:1, but it is preferred to provide an excess of the 4-chlorobutyro-phenone compound II. In order to accelerate the reaction, a small amount of an alkali metal iodide may be added to the reaction mixture. Alcohols or a mixture of dimethylformamide and tetrahydrofuran are preferred as inert organic solvents.

The compound of the present invention is an organic base and therefore forms acid addition salts with inorganic or organic acids. Examples of nontoxic, pharmacologically acceptable acid addition salts are those formed with hydrochloric acid, hydrobromic acid, sulfuric acid, nitric acid, acetic acid, propionic acid, caproic acid, methanesulfonic acid, tartaric acid, fumaric acid, maleic acid, citric acid, ascorbic acid, 8-chlorotheophylline or the like.

The staring compounds of the formula I may be prepared according to known methods, for example, by subjecting m-methoxy-benzylcyanide to a cyclizing reaction with an amide of the formula

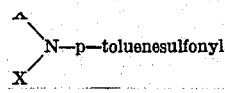

wherein X represents a β-haloethyl group, according to Eisleb, Chem. Ber. 74 (1941), 1433, followed by ether cleavage (see German Pat. No. 679,281 and Swiss Pat. No. 236,312).

Grignard reactions of 4-phenyl-4-cyano-piperidines have repeatedly been described in the literature (see, for example, German Pat. No. 679,281).

The following example further illustrates the invention and will enable others skilled in the art to understand it more completely.

EXAMPLE 1

Preparation of 1-[4'-oxo-4'-(p-fluoro-phenyl)-n-butyl-1']-4-acetyl-4-(m-hydroxy-phenyl)-piperidine and its hydrochloride A mixture consisting of 0.03 mol of 4-(m-hydroxyphenyl)-4-propionyl-piperidine, 0.038 mol of 4-chloro-1-(p-fluoro-phenyl)-butanone-(1), 0.03 gm of potassium iodide, 0.045 mol of sodium bicarbonate, 40 cc of dimethylformamide and 100 cc of tetrahydrofuran was refluxed for 24 hours. Thereafter, the solvents were evaporated in vacuo, and the residue was shaken with a mixture of chloroform and water. The aqueous phase was separated and was again extracted with chloroform. The combined chloroform extract solutions were washed twice with water and were then dried over sodium sulfate. The dry solution was filtered, and the filtrate was evaporated in vacuo. The oily residue was crystallized from ethanol, yielding 70 percent of theory of 1-[4'-oxo-4'-(p-fluoro-phenyl)-n-butyl-1']-4-acetyl-4-(m-hydroxy-phenyl)-piperidine.

The free base product thus obtained was dissolved by boiling it with 12 cc of ethanolic 2.5N hydrochloric acid and a barely sufficient amount of ethanol. Upon cooling, a crystalline precipitate separated out of the solution, the solution was further cooled in a refrigerator, and the precipitate was collected, washed with ice-cold ethanol and dried. 68.5 percent of theory of the hydrochloride of the base, m.p. 208° C, were obtained.

The compound according to the present invention and their nontoxic, pharmacologically acceptable acid addition salts, have useful pharmacodynamic properties. More particularly, the compound of the instant invention exhibits very strong non-narcotic analgesic activities, and, furthermore, anticonvulsive properties. It shows almost no neuroleptic side-effects, and has an extraordinarily low toxicity in warm-blooded animals, such as mice, dogs and rats, as evidenced by the tests described below.

The compound of the present invention and the analogous compound disclosed in U.S. Pat. No. 3,080,372 to Janssen listed in the table below were tested for analgesic activity, using the so-called writhing test described by E. Siegmund, R. Cadmus and G. Lu in "Proceedings of the Society for Experimental Biology and Medicine," Vol. 23, page 97 (1957). Briefly summarized, this simple and reliable method for evaluating non-narcotic analgesics in laboratory animals involves the following procedure:

In CF No. 1 male mice, a typical "syndrome" is produced by intraperitoneal injection of 0.25 ml of 0.02 percent aqueous solution of 2-phenyl-1,4-benzoquinone, henceforth referred to as phenyl quinone. This compound is dissolved in 5 percent ethyl alcohol and distilled water, and the solution maintained at 37° C. The "syndrome" is characterized by intermittent contractions of the abdomen, twisting and turning of trunk and extension of hind legs, beginning 3 to 10 minutes after injection and persisting for more than one hour. Only those mice that exhibit the "syndrome" repeatedly within 10 minutes following injection of phenyl quinone are used. All untreated mice will exhibit the "syndrome" at least once in a 5 minute period. Therefore, after administration of the test drug, a 5 minute observation period is repeated at 15 minute intervals. As the "syndrome" occurs, the mice are removed from the cage. Those remaining are considered to show an analgesic effect. Several nontoxic graded doses of the substance being tested are spaced logarithmically and administered to different groups of mice. The dose-response curve is obtained by basing observations on the all-or-none response. The $ED_{50}$ s are determined according to the Litchfield and Wilcoxon Method, J. T. Litchfield, Jr., and F. Wilcoxon, J. Pharm. Exp. Ther., 1949, Vol. 96, page 99.

The following results were obtained:

TABLE I

| Compound | $ED_{50}$ mg/kg |
|---|---|
| U.S. Patent 3,080,372: | |
| 1-[4'-oxo-4'-(p-fluoro-phenyl)-n-butyl-1']-4-acetyl-4-(m-methoxy-phenyl)-piperidine | 0.125 |
| Present invention | |
| 1-[4'-oxo-4'-p-fluoro-phenyl)-n-butyl-1']-4-acetyl-4-(m-hydroxy-phenyl)-piperidine | 0.035 |

The compound of the present invention and the reference compound were further tested for their neuroleptic activities. The pharmacological test method for neuroleptic activity used in these tests is based upon observation of the behavior of the test animals subsequent to administration of varying dosages of the compounds under investigation. Depending upon the size of the dose and the neuroleptic activity of the compound, certain typical symptoms are released, and the sequence of their occurrence is as follows:

1. Positive slide test: The test animals can no longer maintain their hold on a metal plate which is inclined at an angle of 35° and slide off;
2. Ataxia: The test animals walk in a stumbling and erratic fashion and their movements are no longer coordinated. However, the standing reflex is still present. (This condition was previously designated as "hypnotic effect").
3. Standing reflex absent: The animal can no longer change from the side position to the standing position on its own, but still reacts to stimulations. The righting reflex is still present.
4. Righting reflex absent: The test animal can no longer move on its own from the supine position to the side position and, as a rule, no longer reacts to stimulations; i.e. the animal can not be awakened. (This condition was previously designated as "narcotic effect").
5. Death.

A change in the sequence of these syptoms does not, as a rule, occur.

As test animals adult laboratory mice having an average body weight of about 20 gm were used. Ten animals per dose per compound were used. The dosage levels were 1/27, 1/9, ⅓, 1, 3, 9 and 27 millimol/kg. One millimol/kg was used as the central dose. Each dose was administered in an oil-in-water emulsion by means of an esophageal sound. The condition and behavior of the test animals were observed and recorded 15, 30, 45, 60, 90, 120, 150, 180 and 300 minutes and 24 hours after administration of each dose. From the data thus obtained, the following median effective doses of each of the compounds in question were graphically determined by preparing a dose-activity curve with logarithmic dosage abscissa and extrapolation of the 50 percent value in the probability grid:

a. The median ataxic dose ($AD_{50}$), i.e. the dose at which the movements of 50 percent of the test animals are no longer coordinated, but the standing reflex is still present;
b. The median standing reflex dose ($SD_{50}$), i.e. the dose at which 50 percent of the test animals no longer change from the side position to the standing position on their own, but still react to stimulations;
c. The median righting reflex dose ($RD_{50}$), i.e. the dose at which 50 percent of the test animals no longer move on its own from the supine position to the side position, and generally do not react on stimulation; and
d. The median lethal dose ($LD_{50}$), i.e. the dose which causes 50 percent of the test animals to perish within 24 hours after administration of the test compound.

The results of this test are compiled in the following table.

TABLE II

| Compound | $AD_{50}$ mgm/kg | $SD_{50}$ mgm/kg | $RD_{50}$ mgm/kg |
|---|---|---|---|
| U.S. Patent 3,080,372 1-[4'-oxo-4-(p-fluorophenyl-n-butyl-1'] 4-acetyl-4-(m-methoxy-phenyl)-piperidine | 58 | 160 | 300 |
| Present-Invention 1-[4'-oxo-4-(p-fluoro-phenyl) -n-butyl-1']- 4-acetyl-4-(m-hydroxy-phenyl)-piperidine | 88 | 1180 | inactive |

In the middle and upper dose ranges convulsions, partially with acute exitus, were observed when testing the prior art compound.

In a third test the anticonvulsive activity of the compounds involved was compared using the maximum electroshock method. In this test method the animals are shocked with eye-electrodes with an electrical current of 90V and 30 mA. Under this condition 100 percent of the untreated animals exhibit the typical maximal tonic convulsions. Under the influence of anticonvulsive substances the maximal tonic convulsion is partially or completely impaired. The $ED_{50}$ is the dose, at which 50 percent of the animals show the maximal tonic convulsions.

This test gave the following results:

TABLE III

| Compound | $ED_{50}$ mgm/kg |
|---|---|
| U.S. Patent 3.080.372 | |
| 1-[4'-oxo-4-(p-flurorphenyl)- | inactive | n-butyl-1']-
4-acetyl-4-(m-methoxy-phenyl)-
piperidine
Present Invention
1-[4'-oxo-4-(p-fluoro-phenyl)-
n-butyl-1']-
4-acetyl-4-(m-hydroxy-phenyl)-
piperidine                                          150

The toxicity of the compounds of the present invention was determined and compared to that of the analogous compound disclosed by Janssen in adult white laboratory mice by means of a standard test method. More particularly, each compound is administered perorally in an oil-in-water emulsion by means of an esophageal sound to a statistically significant number of test animals at varying dosage levels, namely at 3, 9, 27, 81 etc. millimols/kg, i.e. in increasing geometric progression. After administration of each dosage the animals are observed for a period of 24 hours, and at the end of that time the number of animals which had died is determined. From these raw values a dose-effect graph with logarithmic dose abscissa is prepared, and the graph is used to calculate the median lethal dose ($LD_{50}$) in the probability grid pursuant to standard statistical procedures. In a similar manner the toxicity was determined in dogs and rats. The following results were obtained:

TABLE IV

| Compound | Mice,s.c. | Dogs,s.c. | Dogs, p.o. | rats,s.c. |
|---|---|---|---|---|
| U.S. Pat. 3,080,372 1-[4'-oxo-4-(p-fluoro-phenyl)-n-butyl-1'] 4-acetyl-4-(m-methoxy-phenyl)-piperidine | 380 | 80 | 338 | 300 |
| Present-Invention 1-[4'-oxo-4-(p-fluoro-phenyl)-n-butyl-1']-4-acetyl-4-(m-hydroxy-phenyl)-piperidine | 3870 | 240 | 1000 | 2600 |

For pharmaceutical purposes, the compound of the present invention is administered to warm-blooded animals perorally or parenterally as active ingredients of customary dosage unit compositions, that is, compositions in dosage unit form consisting essentially of an inert pharmaceutical carrier and one effective dose of the active ingredient, such as tablets, coated pills, wafers, capsules, solutions, suspensions, emulsions, suppositories and the like. One effective analgesic dosage unit of the compound of the present invention is from 0.166 to 5.0 mgm/kg body weight.

The following examples illustrate a few dosage unit compositions comprising the compound of the instant invention as an active analgesic ingredient, and represent the best mode contemplated of putting the invention to practical use. The parts are parts by weight unless otherwise specified.

EXAMPLE 2

Tablets
The tablet composition was compounded from the following ingredients:

| | |
|---|---|
| 1-[4'-oxo-4'-( p-fluoro-phenyl)-n-butyl-1']-4-(m-hydroxy-phenyl)-4-acetyl-piperidine-hydrochloride | 75 parts |
| Lactose | 100 " |
| Corn starch | 65 " |
| Colloidal silicic acid | 2 " |
| Soluble starch | 5 " |
| Magnesium stearate | 3 " |
| Total | 250 parts |

Compounding Procedure
The piperidine compound was intimately admixed with the lactose, the corn starch and the silicic acid, the mixture was moistened with an aqueous solution of the soluble starch. The moist mass was granulated by forcing it through a small-mesh screen, the moist granulate was dried, the dry granulate was admixed with the magnesium stearate, and the mixture was pressed into 250 mgm tablets. One tablet contained 75 mgm of the piperidine compound and, when administered perorally to a warm-blooded animal of about 60 kg body weight in need of such treatment, produced very good non-narcotic analgesic effects.

EXAMPLE 3

Suppositories
The suppository composition was compounded from the following ingredients:

| | |
|---|---|
| 1-[4'-oxo-4'-( p-fluoro-phenyl)-n-butyl-1']-4-(m-hydroxy-phenyl)-4-acetyl-piperidine-hydrochloride | 5 parts |
| Lactose | 295 parts |
| Cocoa butter | 1400 parts |
| Total | 1700 parts |

Compounding procedure:
The piperidine compound and the lactose were intimately admixed with each other, the mixture was homogeneously distributed in the molten cocoa butter by means of an immersion homogenizer, and the resulting composition was poured into cooled suppository molds, each holding 1,700 mgm of the said composition. One suppository contained 5 mgm of the piperidine compound and, when administered by the rectal route to a warm-blooded animal of about 60 kg body weight in need of such treatment, produced very good non-narcotic analgesic effects.

EXAMPLE 4

Hypodermic Solution
The solution was compounded from the following ingredients:

| | | |
|---|---|---|
| 1-[4'-oxo-4'-( p-fluoro-phenyl)-n-butyl-1']-4-( m-hydroxy-phenyl)-4-acetyl-piperidine-hydrochloride | | 50 parts |
| Sodium chloride | | 7 parts |
| Double-distilled water | q.s.ad | 1000 parts by vol. |

Compounding Procedure
The piperidine compound and the sodium chloride were dissolved in a sufficient amount of double-distilled water, the solution was diluted to the indicated volume with more double-distilled water, the solution was filtered until free from suspended matter, and the filtrate was filled into 1 cc ampules, which were then sterilized at 120° C for 20 minutes and sealed. Each ampule contained 50 mgm of the piperidine compound, and when the contents thereof were administered by intramuscular injection to a warm-blooded animal of about 60 kg body weight in need of such treatment, very good non-narcotic analgesic effects were obtained.

EXAMPLE 5

Drop Solution

The solution was compounded from the following ingredients:

Compounding Procedure

The individual ingredients were dissolved in the demineralized water, and the solution was filtered until free from suspended matter. Ten cubic centimeter of the solution contained 200 mgm of the piperidine compound and, when administered perorally to a warm-blooded animal of about 60 kg body weight in need of such treatment, produced very good non-narcotic analgesic effects.

Analogous results were obtained when any other non-toxic, pharmacologically acceptable acid addition salt thereof was substituted for the particular piperidine compound in Examples 2 through 5. Moreover, the amount of active ingredients in these examples may be varied to achieve the dosage unit range set forth above, and the amounts and nature of the inert pharmaceutical carrier ingredients may be varied to meet particular requirements. While the present invention has been illustrated with the aid of certain specific embodiments thereof, it will be readily apparent to others skilled in the art that the invention is not limited to these particular embodiments, and that various changes and modifications may be made without departing from the spirit of the invention.

We claim:
1. A compound of the formula

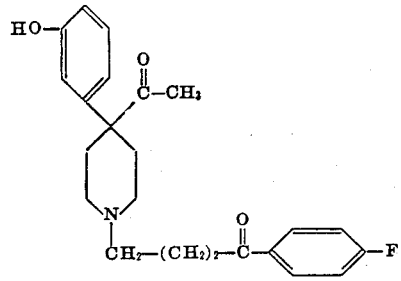

or a non-toxic, pharmacologically acceptable acid addition salt thereof.

* * * * *